(12) United States Patent
Li et al.

(10) Patent No.: US 9,543,992 B2
(45) Date of Patent: *Jan. 10, 2017

(54) SIMULCASTING MIMO COMMUNICATION SYSTEM

(71) Applicant: AT&T Intellectual Property II, L.P., Atlanta, GA (US)

(72) Inventors: Ye Li, Marietta, GA (US); Nelson Ray Sollenberger, Farmingdale, NJ (US); Jack Harriman Winters, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,701

(22) Filed: Apr. 21, 2014

(65) Prior Publication Data

US 2014/0226618 A1 Aug. 14, 2014

Related U.S. Application Data

(63) Continuation of application No. 13/372,313, filed on Feb. 13, 2012, now Pat. No. 8,705,452, which is a
(Continued)

(51) Int. Cl.
| | |
|---|---|
| *H04B 7/04* | (2006.01) |
| *H04B 7/02* | (2006.01) |
| *H04W 72/10* | (2009.01) |
| *H04H 20/71* | (2008.01) |
| *H04B 1/04* | (2006.01) |
| *H04L 5/00* | (2006.01) |
| *H04B 7/06* | (2006.01) |

(Continued)

(52) U.S. Cl.
CPC ......... *H04B 1/0475* (2013.01); *H04B 7/0413*
(2013.01); *H04L 5/0023* (2013.01); *H04B 7/0669* (2013.01); *H04L 27/2626* (2013.01); *H04L 27/2647* (2013.01); *H04W 88/08* (2013.01)

(58) Field of Classification Search
CPC ... H04B 7/0413; H04B 7/0452; H04B 7/0613; H04B 7/0686; H04B 7/0689; H04B 7/0691; H04B 7/0697; H04B 7/08; H04B 7/0891; H04L 27/2626; H04L 27/2647; H04L 5/0023; H04W 88/08
USPC ............... 370/208, 210, 242, 291, 328, 342, 343,370/344, 345, 347, 365, 480, 503; 455/63.1, 455/501, 503, 562.1
See application file for complete search history.

(56) References Cited

U.S. PATENT DOCUMENTS

| | | |
|---|---|---|
| 4,570,265 A | 2/1986 | Thro |
| 5,038,403 A | 8/1991 | Leitch |
| (Continued) | | |

OTHER PUBLICATIONS

Health et al, Characterization of MIMO Channels for Spatial Multiplexing Systems, IEEE 2001, pp. 591-595.
(Continued)

*Primary Examiner* — Ahmed Elallam

(57) ABSTRACT

A wireless multiple-input multiple output (MIMO) communication system includes signaling simulcasting. Base stations include a plurality of transmit antennas and terminals include a plurality of receive antennas to form MIMO channels. In one embodiment, a simulcasting MIMO wireless communication system includes orthogonal frequency division multiplexing (OFDM). This arrangement achieves the spectral efficiency advantages of OFDM and simulcasting.

20 Claims, 7 Drawing Sheets

Related U.S. Application Data continuation of application No. 09/935,069, filed on Aug. 22, 2001, now Pat. No. 8,116,260.

(51) Int. Cl.
*H04L 27/26* (2006.01)
*H04W 88/08* (2009.01)

(56) References Cited

U.S. PATENT DOCUMENTS

| | | | |
|---|---|---|---|
| 5,117,503 A | 5/1992 | Olson | |
| 5,345,599 A | 9/1994 | Paulraj et al. | |
| 5,388,102 A | 2/1995 | Griffith et al. | |
| 5,485,463 A | 1/1996 | Godoroja | |
| 5,535,215 A | 7/1996 | Hieatt, III | |
| 5,537,398 A | 7/1996 | Siwiak | |
| 5,559,808 A | 9/1996 | Kostreski et al. | |
| 5,666,365 A | 9/1997 | Kostreski | |
| 5,678,193 A | 10/1997 | Helm et al. | |
| 5,692,019 A | 11/1997 | Chang et al. | |
| 5,729,549 A | 3/1998 | Kostreski et al. | |
| 5,737,322 A * | 4/1998 | Burbidge | H04W 8/245 340/7.22 |
| 5,742,590 A | 4/1998 | Lin et al. | |
| 5,781,541 A | 7/1998 | Schneider | |
| 5,845,199 A | 12/1998 | Longshore | |
| 5,852,612 A | 12/1998 | Kostreski et al. | |
| 5,867,478 A | 2/1999 | Baum et al. | |
| 5,873,044 A | 2/1999 | Goldberg et al. | |
| 5,890,055 A | 3/1999 | Chu et al. | |
| 5,915,210 A | 6/1999 | Cameron et al. | |
| 6,061,574 A | 5/2000 | Goldberg | |
| 6,112,100 A | 8/2000 | Ossoinig et al. | |
| 6,115,427 A | 9/2000 | Calderbank et al. | |
| 6,127,971 A | 10/2000 | Calderbank et al. | |
| 6,141,543 A | 10/2000 | Souissi et al. | |
| 6,178,333 B1 | 1/2001 | Feuerstein et al. | |
| 6,256,301 B1 | 7/2001 | Tiedemann et al. | |
| 6,314,082 B1 | 11/2001 | Malmgren | |
| 6,347,235 B1 * | 2/2002 | Angus | H04W 84/022 455/562.1 |
| 6,353,606 B1 * | 3/2002 | Hill | H04H 20/67 340/10.1 |
| 6,473,467 B1 | 10/2002 | Wallace et al. | |
| 6,654,617 B1 | 11/2003 | Angus et al. | |
| 6,850,481 B2 | 2/2005 | Wu et al. | |
| 6,885,630 B2 | 4/2005 | Kostic et al. | |
| 6,891,897 B1 | 5/2005 | Bevan et al. | |
| 6,952,454 B1 | 10/2005 | Jalali et al. | |
| 6,975,666 B2 | 12/2005 | Affes et al. | |
| 7,047,016 B2 | 5/2006 | Walton et al. | |
| 7,068,628 B2 | 6/2006 | Li et al. | |
| 7,233,625 B2 | 6/2007 | Ma et al. | |
| 7,248,638 B1 | 7/2007 | Banister | |
| 7,310,304 B2 | 12/2007 | Mody et al. | |
| 8,116,260 B1 | 2/2012 | Li et al. | |
| RE43,812 E * | 11/2012 | Schilling | H04B 1/7115 375/141 |
| 8,705,452 B2 * | 4/2014 | Li et al. | 370/328 |
| 2002/0147978 A1* | 10/2002 | Dolgonos | H04L 12/1836 725/62 |
| 2002/0154705 A1 | 10/2002 | Walton et al. | |
| 2002/0193146 A1* | 12/2002 | Wallace et al. | 455/562 |
| 2003/0012308 A1 | 1/2003 | Sampath et al. | |
| 2003/0087673 A1 | 5/2003 | Walton et al. | |
| 2003/0162547 A1 | 8/2003 | McNair | |
| 2006/0209756 A1 | 9/2006 | Kostic et al. | |
| 2007/0064659 A1 | 3/2007 | Li et al. | |
| 2007/0140374 A1 | 6/2007 | Raleigh et al. | |

OTHER PUBLICATIONS

A. Chevreuil et al.; "MIMO MMSE-DFE: A General Framework"; 1988 IEEE; pp. 368-371.

Ruly Lai-U Choi et al.; "MIMO CDMA Antenna Systems"; 2000 IEEE; pp. 990-994.

L. Vandendorpe et al.; "About the Asymptotic Performance of MMSE MIMO DFE for Filter-Bank Based Multicarrier Transmission"; IEEE Transactions on Communications, vol. 47, No. 10; Oct. 1999; pp. 1472-1475.

Jitendra K. Tugnait; "On Linear Predictors for a MIMO Channels and Related Blind Identification and Equalization"; IEEE Signal Processing Letters, vol. 5, No. 11; Nov. 1998; pp. 289-291.

L. Vandendorpe; "MIMO DFE Equalization for Multitone DS/SS Systems over Multipath Channels"; IEEE Journal on Selected Areas in Communications, vol. 14, No. 3; Apr. 1996; pp. 502-511.

Jian Yang; "On Joint Transmitter and Receiver Optimization for Multiple-Input-Multiple-Output (MIMO) Transmission System"; IEEE Transactions on Communications, vol. 42, No. 12; Dec. 1994; pp. 3221-3231.

V.K. Jones et al.; "Channel Estimation for Wireless OFDM Systems"; 1998 IEEE; pp. 980-985.

S. Catreux et al.; "Capacity and Performance of Multiple-Input Multiple-Output Wireless Systems in a Cellular Context"; 1999 IEEE; pp. 516-519.

Fan Lu et al.; "A New Soft Handoff Scheme using Signal Prediction Priority Queuing for the CDMA Dynamic Simulcast System"; Int'l Conference on Information, Communications and Signal Processing; ICICS '97; Singapore, Sep. 9-12, 1997; pp. 1776-1780.

Sirikiat Ariyavisitakul et al.; "Performance of Simulcast Wireless Techniques for Personal Communication Systems"; IEEE Journal on Selected Areas in Communications, vol. 14, No. 4. May 1996; pp. 632-643.

Mahmond El-Fandi et al.; "Uncorrelated Multisymbol Signals for MIMO System Identification"; IEEE Transaction on Instrumentation and Measurement, vol. 47, No. 5; Oct. 1998; pp. 1133-1138.

\* cited by examiner

SIMULCASTING MIMO COMMUNICATION SYSTEM

This application is a continuation of U.S. patent application Ser. No. 13/372,313, filed Feb. 13, 2012, now U.S. Pat. No. 8,705,452 and is a continuation of U.S. patent application Ser. No. 09/935,069, filed Aug. 22, 2001, now U.S. Pat. No. 8,116,260, all of which are incorporated herein by reference in their entirety.

CROSS REFERENCE TO RELATED APPLICATION AND STATEMENT REGARDING FEDERALLY SPONSORED RESEARCH

Not Applicable

FIELD OF THE INVENTION

The present invention relates generally to communication systems and, more particularly, to wireless communication systems.

BACKGROUND OF THE INVENTION

A wide variety of wireless communication techniques can be used to transmit and receive data between a transceiver, e.g., a base station, and a terminal, e.g., a mobile phone or station. Exemplary network types include time division multiplexing (TDM), frequency division (FDM), and code division. Each of these systems has concomitant advantages and disadvantages. For example, single carrier systems, such as TDM and FDM, suffer problems from signal delay spread, which can degrade system performance and impact the overall efficiency.

Simulcasting techniques for wireless communication are well known in the art. In general, a plurality of transmitting stations each simultaneously transmits a given signal from the same frequency (FDM) and/or time (TDM) slots. Users within areas covered by the simulcasting transmitters receive the simulcast signals. When near cell boundaries, a user will receive a simulcast signal from each base station serving a neighboring cell. Simulcasting enhances coverage and spectrum efficiency as compared to systems that broadcast a given signal on different channels for each user requesting the signal when the same signal is requested by multiple users.

However, simulcasting systems suffer some of the same disadvantages as non-simulcasting technologies. For example, single carrier simulcasting systems typically suffer problems from signal delay spread and co-channel interference and limited frequency re-use for non-simulcast signals. Furthermore, delay spread can be even longer in simulcast systems since the signal is transmitted by many base stations which may be located at a range of distances from a mobile receiver.

Multiple-input multiple-output (MIMO) is another technique that increases spectral efficiency. In MIMO systems, multiple transmit antennas transmit different signals, all of which are separated and detected by multiple receive antennas. In general, with M receive antennas, up to M signals, either MIMO or co-channel interfering signals, or a combination thereof, can be separated and detected and/or suppressed at the receiver. Thus, when co-channel interference is not present, the use of N transmit and M receive antennas results in an increase in link capacity of the minimum of N and M, i.e., if N less than or equal to M, an N-fold increase in capacity, theoretically without any increase in total transmit power. However, N-fold MIMO increases the number of co-channel interferers N-fold, requiring an N-fold increase in the number of receive antennas to suppress the co-channel interference. Alternatively, for a given number of receive antennas, the degree of MIMO permitted in a system is reduced with aggressive frequency re-use, if MIMO is permitted at all.

It would, therefore, be desirable to provide a wireless simulcasting communication system that overcomes the aforesaid and other disadvantages.

SUMMARY OF THE INVENTION

The present invention provides a wireless multiple-input multiple-output (MIMO) communication system having simulcasting capability. This arrangement provides a spectrally efficient system that combines the advantages of MIMO and simulcasting techniques since simulcasting has limited co-channel interference (CCI), MIMO can be used to its fullest capability. While the invention is primarily shown and described in conjunction with a wireless cellular system, it is understood that the invention is applicable to wireless systems in general, in which spectral efficiency is desired.

In one aspect of the invention, a wireless communication system includes a plurality of base stations, each having a plurality of transmit antennas, and a plurality of mobile stations, each having a plurality of receive antennas. In one embodiment, each of the plurality of base stations serves a respective cell or sector. The base stations can simulcast one or more signals to the mobile stations located throughout the wireless system.

In a further aspect of the invention, a wireless orthogonal frequency division multiplexing (OFDM) communication system includes a plurality of simulcasting MIMO base stations for communicating with a plurality of mobile stations. With this arrangement, the system receives the advantages of OFDM systems (e.g., mitigation of signal delay spread) the advantages of simulcasting systems (e.g., relatively high spectral efficiency without co-channel interference) and the full use of MIMO because of the lack of co-channel interference.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
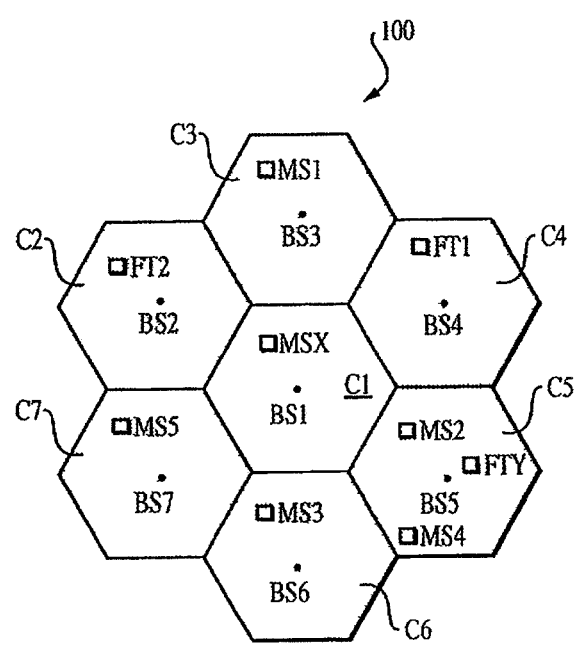
FIG. 1 is a schematic representation of a wireless MIMO communication system having simulcasting capability in accordance with the present invention.

FIG. 1 shows a wireless communication system 100 providing multiple-input multiple-output (MIMO) data communication between simulcasting base stations BS1-BS7, each of which covers a respective cell or sector C1-C7, and mobile stations MS1-MSX and/or fixed-location terminals FT1-FTY. As described in detail below, the base stations BS include a plurality of transmit antennas that form respective MIMO channels with receive antennas located on the mobile stations MS and fixed terminals FT. The system achieves the advantages of simulcasting and MIMO systems. In one particular embodiment, the communication system utilizes orthogonal frequency division multiplexing (OFDM) to minimize the effects of signal delay spread, further enhancing the system spectral efficiency.

Simulcasting is well known to one of ordinary skill in the art. In general, simulcasting refers to the broadcast of a given signal by a plurality of base stations BS or transmitters. Mobile stations MS and/or fixed terminals FT located within the cells covered by the base stations BS receive the signal. Near cell boundaries, a user can receive multiple versions of simulcast signals, which can improve the system performance by providing better coverage with a stronger signal, as well as better performance because of the lack of co-channel interference. Simulcasting is useful in a variety of network configurations. For example, a high demand channel, such as real-time stock quotes, can be broadcast by each base station serving at least one user that desires to receive the channel. In another embodiment, a network can simulcast a signal from a series of low power transmitters, which can be located in various buildings, to provide coverage for users anywhere within the buildings. It is understood that the network can selectively simulcast based on user channel demand or can constantly simulcast in predetermined areas without regard for user location.

As is also known in the art, conventional cellular networks have a predetermined re-use factor, such as seven for single carrier systems, for non-simulcast channels. The re-use factor defines the number of cells in a pattern that minimizes co-channel interference. Each base station utilizes a subset of channels to avoid use of the same channels within a predetermined distance. That is, base stations using the same channels should be sufficiently spaced apart so as to minimize co-channel interference. It is understood that simulcast channels do not generate co-channel interference with each other since the same signal is broadcast from different locations in the same frequency/time slots. In addition, since a mobile station located near a cell boundary can receive two relatively weak versions of the same signal, overall system performance can be boosted, e.g., a 3 dB power improvement, coverage can be more uniform, and handoffs are avoided.

Figure 2:
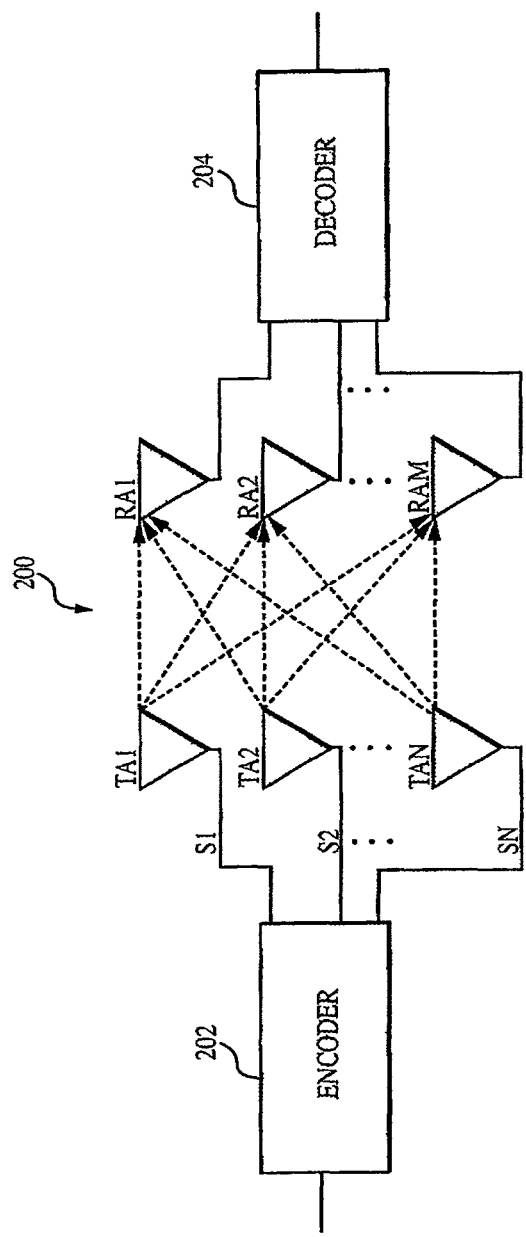
FIG. 2 is a schematic representation showing an exemplary embodiment of a wireless MIMO communication system having simulcasting capability in accordance with the present invention.

FIG. 2 shows an exemplary MIMO system 200 that can form a part of a wireless MIMO simulcasting communication system in accordance with the present invention. The MIMO system 200 can be provided from a variety of wireless network types including time division multiple access (TDMA), code division multiple access (CDMA), frequency division multiple access (FDMA), and orthogonal frequency division multiplexing (OFDM). It is understood that other known and now unknown wireless network technologies can be used to provide a MIMO simulcasting system without departing from the present invention.

In general, the MIMO system 200 includes a plurality of transmit antennas TA1-TAN, each of which broadcasts a respective signal S1-SN. A data stream, which can comprise one or more signals, is encoded by an encoding system 202, which generates the respective signals S1-N for broadcast by the transmit antennas TA1-TAN. The transmitted signals are received by a plurality of receive antennas RA1-RAM associated with a terminal, such as a mobile station. It is understood that the number of receive antennas is not necessarily equal to the number of transmit antennas. The receive antennas RA1-RAM receive the transmitted signals and provide the signals to a decoding system 204 for signal detection and decoding.

Exemplary wireless MIMO systems are shown and described in Chevreuil, A., Vandendorpe, L., "MIMO MMSE-DFE: a General Framework," *Statistical Signal and Array Processing,* 1998. *Proceedings., Ninth IEEE SP Workshop on,* 1998, pages: 368-371, Ruly Lai-U Choi; Letaief, K. B.; Murch, R. D., "MIMO CDMA Antenna Systems," 2000 *IEEE International Conference on Communications,* Volume: 2, 2000 Pages: 990-994 vol. 2, and Jian Yang; Roy, S., "On Joint Transmitter and Receiver Optimization for Multiple-Input-Multiple-Output (MIMO) Transmission Systems," *IEEE Transactions on Communications,* Volume: 42 Issue: 12, December 1994 Pages: 3221-3231, all of which are incorporated herein by reference.

Figure 3:
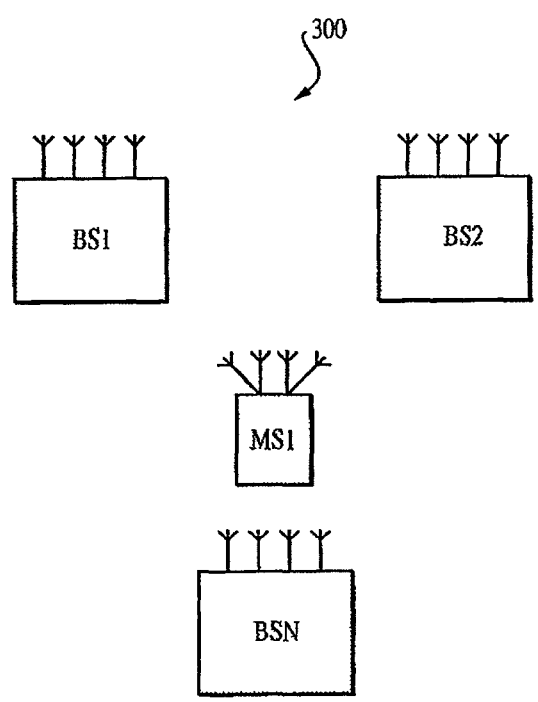
FIG. 3 is a schematic representation of a wireless MIMO OFDM system having simulcasting capability in accordance with the present invention.

FIG. 3 shows an exemplary MIMO OFDM system 300 with simulcasting in accordance with the present invention. The system includes a plurality of MIMO OFDM base stations BS1-BSN simulcasting a signal to a MIMO terminal, such as a mobile station MS1. With this arrangement, the advantages of OFDM systems and simulcasting systems are realized. More particularly, the system 300 obtains the benefits of minimal co-channel interference and increased signal power provided by simulcasting and lack of signal delay spread problems provided by OFDM systems so as to enhance the overall spectral efficiency of the system.

Figure 4:
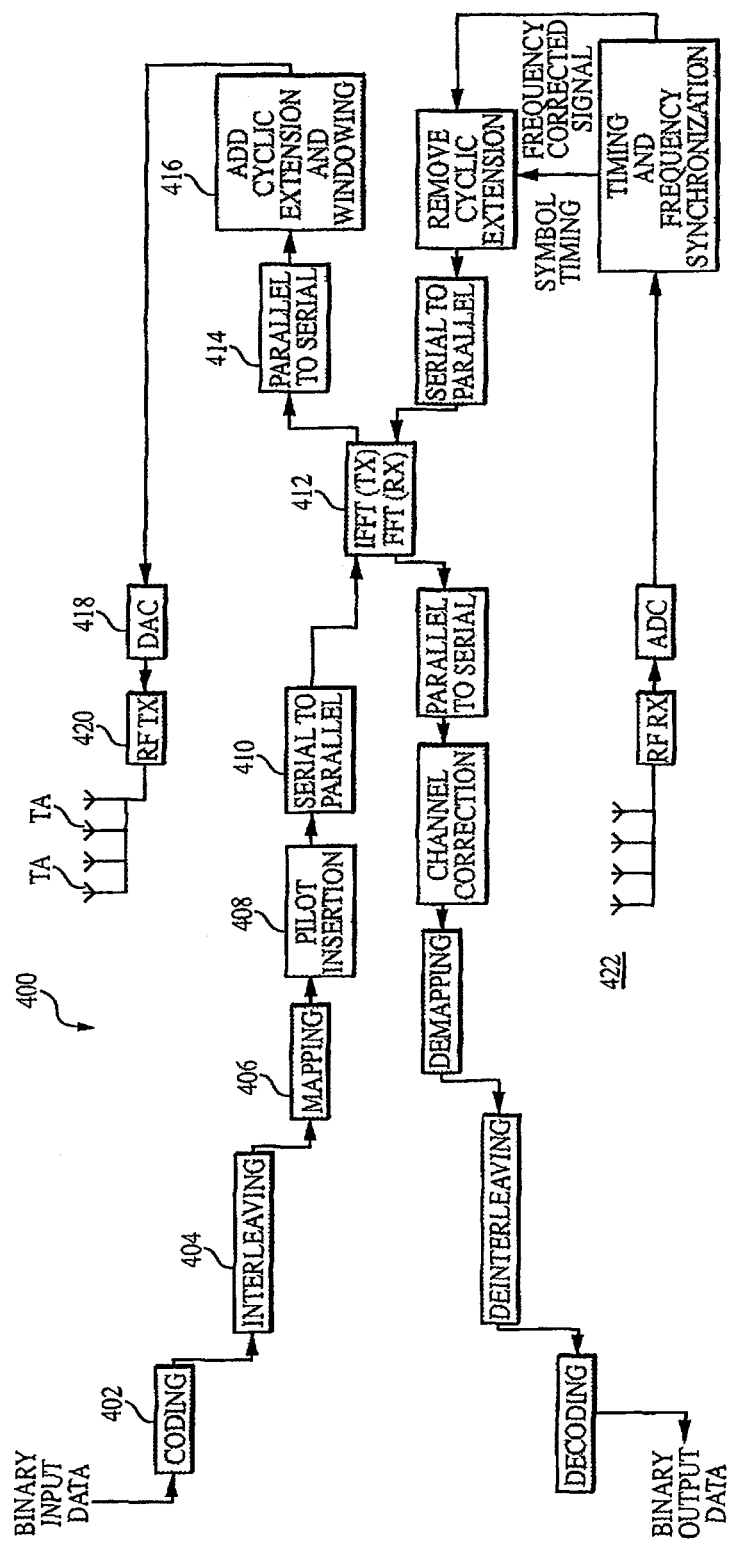
FIG. 4 is an exemplary OFDM MIMO station that can form a part of a simulcasting MIMO communication system in accordance with the present invention.
Figure 5:
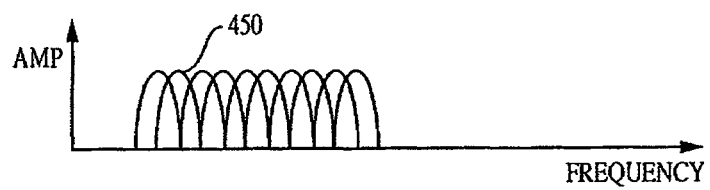
FIG. 5 is a graphical depiction of a subcarrier that can be used in the OFDM MIMO system of FIG. 4.
Figure 6:
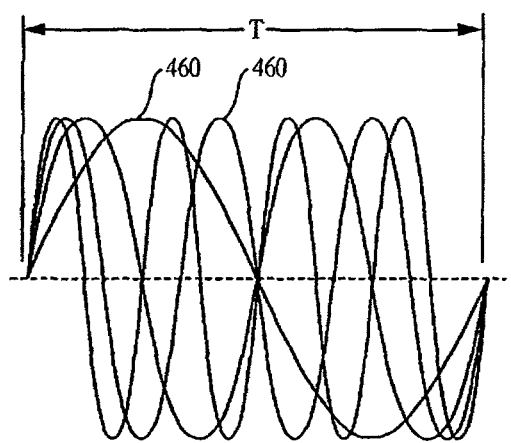
FIG. 6 is a graphical depiction showing the orthogonal nature of the subcarriers of FIG. 5.

Referring briefly to FIGS. 4-6, an exemplary MIMO OFDM system 400, which can form a part of a simulcasting MIMO system in accordance with the present invention, includes subsystems for transmission and reception of data. A coding subsystem 402 encodes binary data from a data source. The coded data is interleaved by an interleaving subsystem 404 and then mapped onto multi-amplitude multi-phase constellation symbols by a mapping subsystem 406. In one particular embodiment, the multi-amplitude multi-phase constellation symbols include quadrature phase shift keying (QPSK) symbols. Pilot signals can then be inserted by a pilot insertion subsystem 408 to estimate the channel at the remote subscriber unit receivers. A serial-to-parallel conversion subsystem 410 converts the serial data stream to a parallel data stream that is provided to an inverse fast Fourier transform (IFFT) subsystem 412.

The transformed data is converted to serial data stream by a parallel-to-serial converter 414. Cyclic extension and windowing can be added by a subsystem 416 prior to digital-to-analog conversion by a DAC 418 and transmission by an antenna system 420 including a plurality of transmit antennas TA. The receive portion 422 of the OFDM system includes similar corresponding components for extracting the data from the received OFDM signal.

As shown in FIG. 5, the OFDM system utilizes an overlapping orthogonal multicarrier modulation technique having a plurality of subcarriers 450. FIG. 6 shows the orthogonal nature of the subcarriers. More particularly, each of four subcarriers 460 of one OFDM data symbol has an integral number of cycles in the interval T. The number of cycles between adjacent subcarriers differs by one.

Figure 7:
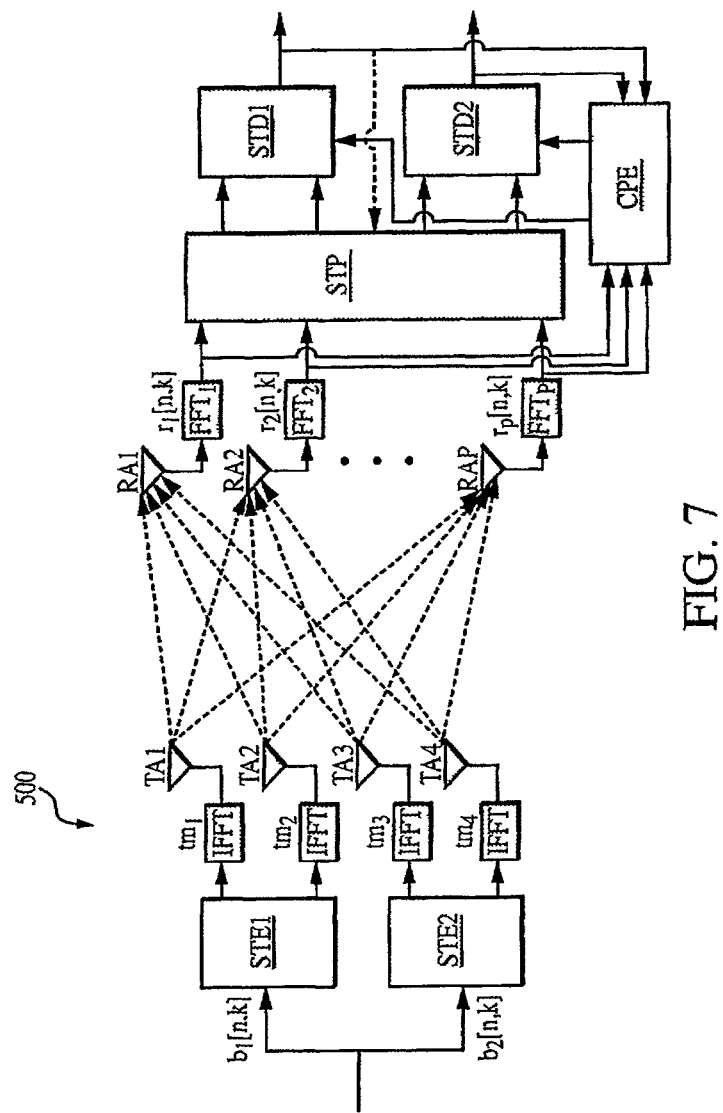
FIG. 7 is an exemplary OFDM MIMO system that can form a part of a simulcasting MIMO communication system in accordance with the present invention.

FIG. 7 shows an illustrative MIMO-OFDM system 500 having multiple (here shown as four) transmit antennas TA1-4 and a plurality of receive antennas RA1-P. A data stream is split into first and second signals that are transmitted by respective pairs of transmit antennas TA1,TA2: TA3,TA4. Although the MIMO-OFDM system is shown having four transmit antennas, it is understood that any number of transmit antennas can be used. In addition, the number of receive antennas can be different from the number of transmit antennas.

The MIMO-OFDM system 500 includes a first space time encoder STE1 that receives a first data block $b_1[n,k]$ and a second space-time encoder STE2 that receives a second data block $b_2[n,k]$. At time n at tone k, each of the two data blocks, $\{b_i[n,k]:k=0, 1, \ldots\}$ for i=1 and 2, is transformed into two signals, $\{t_{2i+j}[n,k]:k=0, 1, \ldots, \& j=1, 2\}$ for i=1 and 2, respectively, through the first and second space-time encoders STE1,STE2. Each of the coded signals forms an OFDM block. The transmit antennas TA1-4 transmit the OFDM signals after respective inverse fast Fourier transform IFFT1-4 modulation by respective signals $tm_i[n,k]$ for i=1, ..., 4.

The signals sent by the transmit antennas TA1-4 are received by the receive antennas RA1-RAP. The received signals $r_1[n,k]$, $r_2[n,k]$, ..., $r_P[n,k]$ are transformed by respective fast Fourier transform (FFT) subsystems FFT1-FFTP to generate signals that are provided to a space-time processor STP, which provides detected signal information to respective first and second space-time decoders STD1, STD2. A channel parameter estimator CPE receives the transformed signals from which channel parameter information is determined and then provided to the space-time processor STP for use in decoding the signals.

To achieve transmit diversity gain and detection of the transmitted signals, the space-time processor STP extracts the required signals for decoding by the first and second space-time decoders STD1, STD2. The space-time processor and space-time decoders each require channel state information. In one embodiment, the CPE utilizes conventional training sequences to exploit time and frequency domain correlations of the channel parameters. Further details of the MIMO-OFDM system 500 of FIG. 7 are provided in U.S. patent application Ser. No. 09/791,523, filed on Feb. 23, 2001, now issued as U.S. Pat. No. 7,068, 628, which is incorporated herein by reference.

By combining simulcasting with MIMO OFDM, the wireless communication system benefits from the spectral efficiency and minimal co-channel interference of simulcasting to enhance MIMO and the mitigation of signal delay spread of the multicarrier OFDM signals.

In an alternative embodiment, a simulcasting MIMO system includes TDM and FDM. The system can transmit both simulcast and non-simulcast signals based upon whether users in the coverage area demand the same signals. Under certain conditions, it may be desirable to reduce the number of MIMO channels to reduce co-channel interference of non-simulcast signals. More particularly, when simulcasting is used over a limited area, with other cells re-using the frequencies, then the level of co-channel interference into the simulcasting system can be higher (particularly near the simulcasting area boundary) and a reduced degree of MIMO may be used.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed:

1. A method for wireless communication, the method comprising:
    transmitting a first signal from a first transmit antenna associated with a first multiple-input multiple-output transmitting station, wherein the transmitting the first signal is performed by utilizing orthogonal frequency division multiplexing; and
    transmitting a second signal from a second transmit antenna associated with the first multiple-input multiple-output transmitting station, wherein the transmitting the second signal is performed by utilizing the orthogonal frequency division multiplexing, wherein the first signal and the second signal are transmitted while the first signal is transmitted from a first transmit antenna associated with a second multiple-input multiple-output transmitting station, and while the second signal is transmitted from a second transmit antenna associated with the second multiple-input multiple-output transmitting station, where the first signal transmitted from both the first multiple-input multiple-output transmitting station and the second multiple-input multiple-output transmitting station is simulcast in a first same frequency, where the second signal transmitted from both the first multiple-input multiple-output transmitting station and the second multiple-input multiple-output transmitting station is simulcast in a second same frequency.

2. The method of claim 1, further comprising:
    receiving the first signal and the second signal on a first antenna associated with a first terminal; and
    receiving the first signal and the second signal on a second antenna associated with the first terminal.

3. The method of claim 1, wherein the first multiple-input multiple-output transmitting station and the second multiple-input multiple-output transmitting station are part of a wireless cellular system.

4. The method of claim 1, wherein the first signal is simulcasted for a high demand channel.

5. The method of claim 4, wherein the high demand channel is for providing stock quotes.

6. The method of claim 1, wherein the first multiple-input multiple-output transmitting station and the second multiple-input multiple-output transmitting station are deployed in a building.

7. The method of claim 1, wherein the first multiple-input multiple-output transmitting station is deployed in a first building and the second multiple-input multiple-output transmitting station is deployed in a second building.

8. The method of claim 1, wherein the orthogonal frequency division multiplexing utilizes overlapping orthogonal multicarrier modulation.

9. The method of claim 8, wherein the overlapping orthogonal multicarrier modulation comprises a plurality of subcarriers.

10. The method of claim 1, wherein the second signal is simulcasted for a high demand channel.

11. A method for wireless communication, the method comprising:
    simulcasting a first signal and a second signal from a plurality of multiple-input multiple-output base stations; and
    non-simulcasting at least one other signal from the plurality of multiple-input multiple-output base stations, wherein the simulcasting the first signal comprises transmitting the first signal in a first same frequency, wherein the simulcasting the second signal comprises transmitting the second signal in a second same frequency, wherein orthogonal frequency division multiplexing is utilized to transmit the first signal and the second signal that are simulcast and the at least one other signal that is non-simulcast.

12. The method of claim 11, wherein the plurality of multiple-input multiple-output base stations is part of a wireless cellular system.

13. The method of claim 11, wherein the simulcasting the first signal comprises simulcasting the first signal for a high demand channel.

14. The method of claim 13, wherein the high demand channel is for providing stock quotes.

15. The method of claim 11, wherein the plurality of multiple-input multiple-output base stations is deployed in a building.

16. The method of claim 11, wherein the plurality of multiple-input multiple-output base stations is deployed in a plurality of buildings.

17. A wireless communication system, comprising:
a terminal comprising a plurality of receive antennas for receiving a plurality of transmitted signals, wherein each of the plurality of transmitted signals is transmitted via a respective one of a plurality of transmit antennas included in a respective one of a plurality of multiple-input multiple-output base stations, wherein the plurality of multiple-input multiple-output base stations simulcasts a first signal from the plurality of transmit antennas in a first same frequency, wherein the plurality of multiple-input multiple-output base stations simulcasts a second signal from the plurality of transmit antennas in a second same frequency, wherein the plurality of transmitted signals is transmitted utilizing orthogonal frequency division multiplexing.

18. The wireless communication system of claim 17, wherein the terminal is a mobile phone.

19. The wireless communication system of claim 17, wherein the wireless communication system is a wireless telephone network.

20. The wireless communication system of claim 17, wherein the terminal comprises a mobile station.

\* \* \* \* \*